United States Patent [19]

Dietrich et al.

[11] Patent Number: 4,951,349
[45] Date of Patent: Aug. 28, 1990

[54] HINGE MOTION REGULATOR FOR EYEGLASSES

[75] Inventors: Anton Dietrich, Munich; Detlef Kreuz, Haag, both of Fed. Rep. of Germany

[73] Assignee: Optische Werke G. Rodenstock, Munich, Fed. Rep. of Germany

[21] Appl. No.: 233,802

[22] Filed: Aug. 19, 1988

[30] Foreign Application Priority Data

Aug. 19, 1987 [DE] Fed. Rep. of Germany ....... 3727706

[51] Int. Cl.⁵ .............................................. G02C 5/22
[52] U.S. Cl. ....................................... 16/228; 16/337; 16/340; 16/342; 351/113; 351/121; 351/153
[58] Field of Search ................. 16/228, 273, 337, 338, 16/339, 342, 340; 351/113, 121, 153

[56] References Cited

U.S. PATENT DOCUMENTS

| | | | |
|---|---|---|---|
| 2,288,657 | 7/1942 | Splaine | 351/113 |
| 2,381,011 | 8/1945 | Splaine | 351/113 |
| 4,018,104 | 4/1977 | Bland et al. | 16/340 |
| 4,491,436 | 1/1985 | Easton | 403/122 |
| 4,675,940 | 6/1987 | Brockhaus | 16/273 |

FOREIGN PATENT DOCUMENTS

| | | | |
|---|---|---|---|
| 231429 | 5/1960 | Australia | 16/340 |
| 2404241 | 5/1979 | France | 16/228 |
| 153931 | 7/1987 | Japan | 351/153 |
| 423641 | 2/1935 | United Kingdom | 351/113 |

*Primary Examiner*—Nicholas P. Godici
*Assistant Examiner*—Edward A. Brown
*Attorney, Agent, or Firm*—Antonelli, Terry & Wands

[57] ABSTRACT

A motion regulator for a hinge such as, for example, a tripartite eyeglass hinge, with at least two hinge tabs and a hinge screw, a sleeve surrounding the hinge screw disposed in a hinge eye of the hinge tab. The sleeve projects beyond the hinge tab and rests against a neighboring hinge tab or tabs. In order to obtain an objective that a braking torque, determining the motion characteristics of the hinge, is substantially constant and independent of the tightening torque of the hinge screw, a spring-elastic element is arranged at least between the hinge tab wherein the sleeve is located and the hinge tab movable with respect to this hinge tab. The spring-elastic element, resilient in the axial direction with respect to the hinge screw axis, is in contact under a pretensioning with a contact surface of at least one hinge tab, which surface is rotationally symmetrical with respect to the hinge screw axis.

24 Claims, 8 Drawing Sheets

HINGE MOTION REGULATOR FOR EYEGLASSES

BACKGROUND OF THE INVENTION

The present invention relates to a motion regulator for a hinge and, more particularly, to a motion regulator for a tripartite eyeglass hinge which includes at least two hinge tabs and a hinge screw, a rigid sleeve surrounding the hinge screw disposed in a hinge eye of a hinge tab, with the sleeve projecting beyond the hinge tab and resting against a neighboring hinge tab or tabs in such a manner that the sleeve rotates with the tab or tabs, and wherein at least one element is provided which is in contact, under a pretensioning, with a contact surface, rotationally symmetrical with respect to the hinge axis of at least one hinge tab.

In, for example, German Patent No. 1,117,911, hinges having interlocking hinge tabs for eyeglass frames are proposed wherein a hinge screw, surrounding by a sleeve, is located in the bores of the hinge tabs. In this proposed construction, the sleeve is fashioned of a plastic material, with a length of the sleeve being larger, by a predetermined amount, than a total length of the associated bores of the hinge tabs. When the eyeglass hinge is screwed or threadably secured together, the sleeve is compressed between the underside of the screw head and an end face of the hinge tab, whereby a certain degree of friction is produced. Since the sleeve contacts the head of the hinge screw, the hinge joint may loosen during pivotal movements of the parts attached to the hinge. Since the braking torque between the hinge halves depends essentially on the tightening torque of the hinge screw, blockage of the hinge may occur in case of the application of too high a tightening torque. After certain period of usage, and with a low tightening torque, the braking torque may no longer be adequate to prevent dropping of the temple, attached to the hinge due to gravity.

In, for example, DOS 2,039,455 an eyeglass hinge is proposed where a sleeve, slides in the axial direction and exhibits a predetermined pretensioning, is inserted in a hinge tab. The end faces of the sleeve, projecting beyond the hinge tab, are in pressure contact with the end faces of neighboring hinge tabs. The friction torque of the hinge is independent of the tightening torque of the screw in this arrangement and is determined by the sleeve in contact in the radial direction. Also in this proposed hinge, drooping of the temple can occur after a certain usage. That is, relaxing of the braking torque can take place since the movement of the sleeve in the radial direction is no longer possible once the hinge screw has been tightened, adjustment of the hinge screw results in an axial vise grip on the sleeve.

In, for example, U.S. Pat. No. 1,867,346 a motion regulating hinge is proposed which includes an element resilient in the axial direction, with the hinge being intended for windows, doors, or the like. A disadvantage to this proposed arrangement resides in the fact that while the friction torque of the hinge screw is independent of the tightening torque of the screw, the tightening torque of the screw must be supported by the external hinge tabs which latter, for that purpose, must be correspondingly firm or rigid.

In, for example, DOS 2,828,980, a hinge is proposed wherein synthetic resin shims with collar sleeves are inserted between the hinge eyes. The collar sleeves may be in contact with each other or they may be formed integrally with the synthetic resin shim. By axial tightening of the screw, the motion regulation is effected. However, a disadvantage of this arrangement resides in the fact that the contact point of the brake surfaces is dependent on the tightening torque of the hinge screw. Moreover, there is a possibility of a relative movement between the collar sleeves and the outer hinge tab. The aim underlying the present invention essentially resides in providing a hinge of the aforementioned type wherein a friction torque of the hinge is independent of the tightening torque of the screw, with the braking torque, determining the motion characteristic of the hinge, being substantially constant over a long period of time. In accordance with advantageous features of the present invention, the element is spring-elastic, and is located at least between a hinge tab wherein a sleeve is arranged and neighboring hinge tab or tabs movable relative to this hinge tab, and is in contact with the contact surface with resilience in the axial direction with respect to the hinge screw axis.

In accordance with advantageous features of the present invention, a rigid sleeve is disposed in a hinge tab, with the sleeve, after tightening of the hinge screw, being immovable with respect to the neighboring hinge tab or tabs and, respectively, with respect to the hinge screw. By virtue of the rigid sleeve, a constant spacing between the elements contacted by the sleeve is determined, with the spacing being independent of the tightening torque of the hinge screw. A spring-elastic element is located between the hinge tab, wherein the sleeve is arranged and the neighboring hinge tab movable relatively to this hinge tab. The spring-elastic element extends essentially in a radial direction and is located on a side of the rigid sleeve facing away from the hinge screw. The spring-elastic element is disposed in a space extending in an axial direction between the contact surface or surfaces and, for example, the level of the rigid sleeve end in contact with the neighboring hinge tab. The height of the space is dimensioned so that the spring-elastic element is movable in an axial direction, and no effect is exerted on the spring-elastic element either by the hinge screw or by the neighboring hinge tabs. The braking moment exerted by the spring-elastic element on the hinge tab or tabs is dependent solely on the pretensioning with which the element rests against the contact surface or surfaces. As soon as the hinge screw has been tightened, a constant braking torque results independently of whether the hinge screw was mounted with a weak or a strong tightening torque.

In contradistinction to the state of the art proposals, in accordance with the present invention, the surface, by way of which the sleeve rests against the neighboring hinge tab, can be dimensioned so that no plastic deformation occurs due to excessive contact pressure. A blockage of the hinge due to the application of a heightening torque is excluded or prevented so that the braking torque and therefore, the motion characteristic of the hinge remains substantially constant over a long period of time.

Preferably, in accordance with the present invention, the spring-elastic element is nonrotatibly or nonrotationally fixed with respect to a hinge tab and rests under a pretensioning against the contact surface of the other hinge tab.

In accordance with still further features of the present invention, the spring-elastic element is a plate spring or, alternatively, may be formed as a corrugated spring ring.

The contact surface on which the spring-elastic element rests does not extend in parallel to the hinge screw axis but rather at an angle thereto. Preferably, according to the invention, the contact surface is oriented or disposed approximately perpendicularly to the hinge screw axis. In any event, the spring-elastic element acts on the contact surface substantially in the axial direction.

In accordance with still further features of the present invention, the spring elastic element is connected with the sleeve and, more particularly, the spring-elastic element is arranged nonrotatably or nonrotationally on the sleeve and, preferably is rigidly joined to the sleeve. Thereby, the spring-elastic element will, in all cases contact the contact surface in the same area of the latter.

Advantageously, according to the present invention, the sleeve may include two spring-elastic elements. In this arrangement, pressure and thus a braking torque are exerted on the hinge tab by way of respectively one contact surface in the zone of each end face of the hinge tab wherein the sleeve is inserted.

Moreover, according to the present invention, the spring-elastic element may be integrally formed with the sleeve and, the two spring-elastic elements, in a zone of each end face of the hinge tab when the sleeve is inserted may be provided with a contact surface with the respective spring-elastic elements being in contact with the respective contact surfaces.

According to the present invention, the sleeve, acting as a spacer member, is not made of one piece but rather includes a basic sleeve member and a ring at which the latter spring-elastic element is integrally formed therewith or is connected thereto.

In accordance with still further advantageous features of the present invention, the sleeve may be formed integrally with the hinge screw and constitute a cylindrical extension. The spring-elastic element, described hereinabove, rests on at least one contact surface and brakes the associated hinge tab. An indentation may be provided for this purpose in the hinge tab wherein the sleeve is inserted. In this situation, the bottom surface of the indentation serves as a contact surface. However, the indentation may also be provided partially in the hinge tab wherein the sleeve is inserted and partially in the neighboring hinge tab or completely in such hinge tab. In the last mentioned situation, an end face of the hinge tab with the sleeve inserted therein serves as the contact surface.

Moreover, it is possible for the spring-elastic element of the present invention be surrounded by a supporting ring, the outer diameter of which is approximately equal to an outer diameter of the central hinge tab, wherein the height of the central hinge tab is smaller by more than a height of the supporting ring than the length of the sleeve.

The supporting ring may be rigidly joined to the sleeve and respectively to the ring with the sleeve including two sleeve sections which contact each other in an assembled condition.

It is also possible in accordance with the present invention to provide a motion regulator wherein a 0-ring is arranged in a zone wherein the spring-elastic element is disposed at the sleeve, with the 0-ring being in contact with the sleeve, and with the spring-elastic element and with the hinge tab which latter is also in contact with the spring-elastic element under a pretensioning. By virtue of this arrangement, advantageously, a spring progression is exhibited that rises gradually and thus is tolerance-insensitive.

The above objects, features, and advantages of the present invention will become more apparent from the following description when taken in connection with the accompanying drawings which show, for the purpose of illustration only, several embodiments in accordance with the present invention.

DETAILED DESCRIPTION

Figure 1:
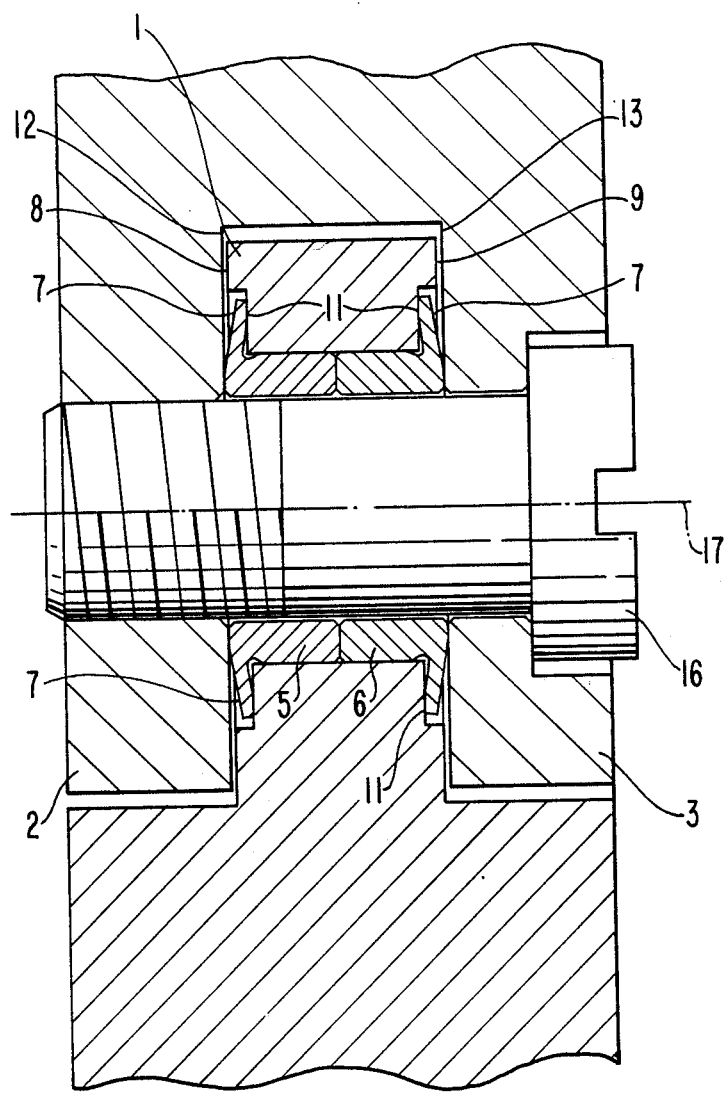
FIG. 1 is a cross-sectional view of an eyeglass hinge with a bipartite sleeve and integrally formed spring-elastic element.

Referring now to the drawings wherein like reference numerals are used through out the various views to designate like parts and, more particularly, to FIG. 1 according to this figure, an eyeglass hinge includes a central hinge tab 1 generally having an eyeglass temple attached thereto, with two neighboring hinge tabs 2, 3 usually connected to a central part of the eyeglasses (not shown) and a hinge screw 16. However, the central part of the eyeglasses can also be attached to a central hinge tab 1, and the eyeglass temple can be attached to the two neighboring hinge tabs 2, 3. A sleeve including two sleeve parts or sections 5, 6 is inserted in a hinge eye of the central hinge tab 1, with the sleeve parts or sections 5, 6 being in contact with each other and projecting beyond the central hinge tab 1, with, for example, the length of the sleeve in a direction of the hinge screw axis 17 being somewhat longer than the height h, (FIG. 3) of the central hinge tab 1. The sleeve is in contact, with its end faces, with the inner end faces 12, 13 of the neighboring hinge tabs 2, 3.

Two spring-elastic elements 7 are integrally formed in a zone of the end faces of the sleeve on the outside face of the sleeve facing away from the hinge screw 16. The sleeve part or section with the spring-elastic element 7 and, respectively, the sleeve part of section 6 with the spring-elastic element 7 are manufactured by turning. The spring-elastic elements 7 each are respectively in contact, under a pretensioning, with one contact surface 11 in the region of the end faces 8, 9 of the central hinge tab 1. In FIG. 1, the contact surfaces 11 are arranged or extend perpendicularly to the longitudinal center axis of the hinge screw 16, with contact surfaces 11 being rotationally symmetrical with respect to the hinge screw axis 17.

Each spring-elastic element 7 extends in a radial direction in an indentation of the central hinge tab 1. In the axial direction, the indentation extends between its bottom surface, serving as the contact surface, and the level of the sleeve end or end face in contact with the neighboring hinge tab. The indentations of the spring-elastic element 7 are dimensioned so that the axial movement of the spring-elastic element 7 would be possible. In order to mount the proposed hinge, the sleeve sections 5, 6, forming the sleeve, may, first of all be inserted with the spring-elastic element 7 in the central hinge tab 1, and the latter can then be placed in the two-tab hinge part 2, 3. The hinge screw 16 is extended through the hinge eyes and, respectively, the sleeve, and is threaded into the hinge tab 2. Due to the sleeve sections 5, 6 acting as a spacer member, the two-tab hinge part 2, 3 can be mounted with the hinge screw 16 as a block without thereby affecting the brake moment exerted by the spring-elastic element 7.

Figure 2:
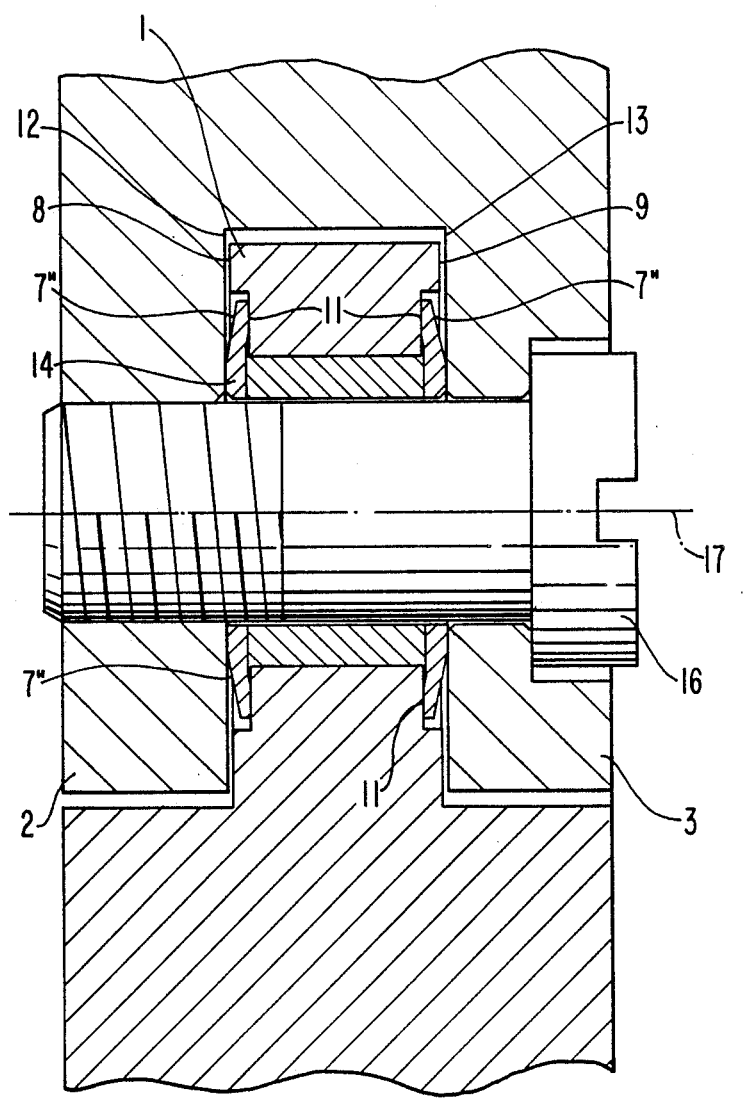
FIG. 2 is a cross-sectional view of an eyeglass hinge with a tripartite sleeve and an integrally formed spring-elastic element.

FIG. 2 provides an eyeglass hinge with a tripartite spacer member, wherein plate springs adjoin both end faces of the basic sleeve body 4, with each of the plate springs including a ring 14 with an integrally molded spring-elastic element 7''. The rings 14 are respectively arranged between the end faces of the basic sleeve body 4 and the neighboring hinge tab 2, 3. Due to the pull exerted by the hinge screw 16, the plate springs are non-rotationally connected with the bipartite hinge part 2, 3. The plate springs exert braking action with annular surfaces in the indentations of the one-piece hinge tab.

Figure 3:
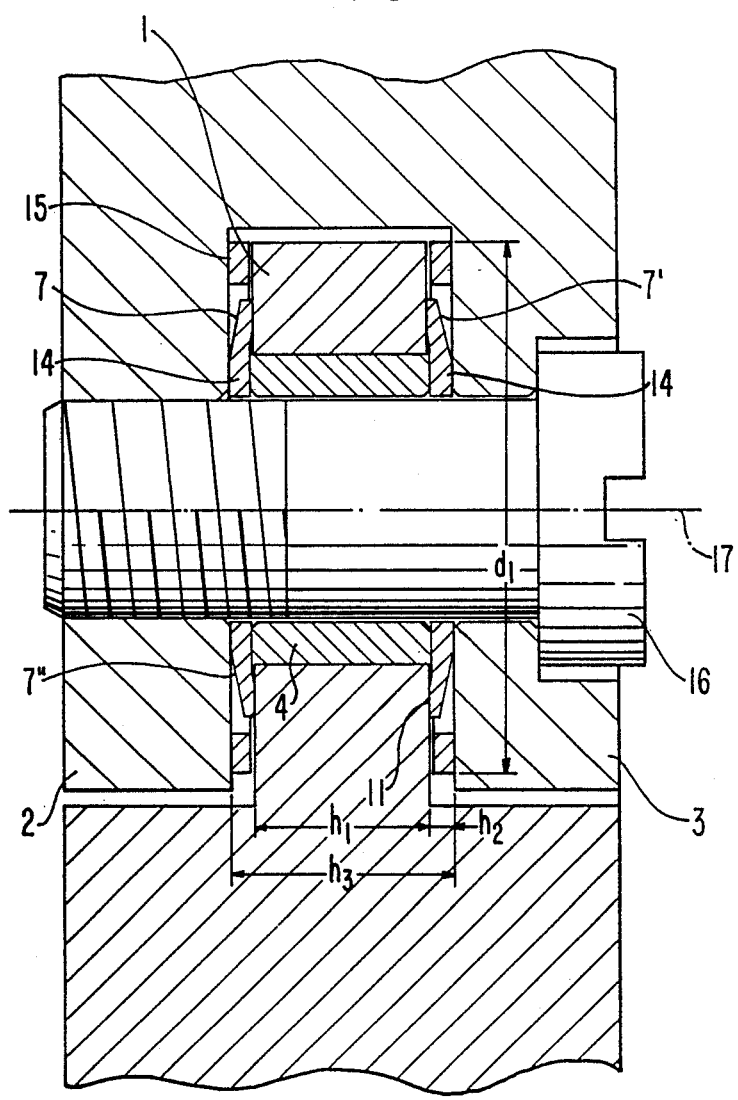
FIG. 3 and 4 are cross-sectional views of an eyeglass hinge with motion regulation without an indentation in the one-piece hinge tab, but with a supporting ring and punched-out plate spring elements.
Figure 5:
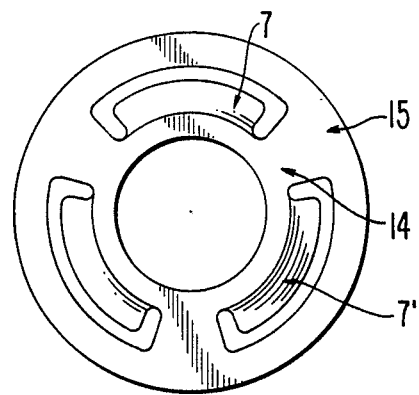
FIG. 5 is a top view of a plate spring with a supporting ring constructed in accordance with the present invention.
Figure 6:
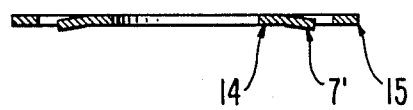
FIG. 6 is a cross-sectional view through the plate spring with supporting ring shown in FIG. 5.

FIG. 3 illustrates an example of an eyeglass hinge with motion regulation without indentations in the one-piece hinge tab. Construction of FIG. 3 may be manufactured in the simple manner and include a basic sleeve member 4 as well as two plate springs. As illustrated in FIGS. 5 and 6, each plate spring is, however, surrounded by a supporting ring 15 integrally formed with the plate spring. The outer diameter $d_2$ of this supporting ring corresponds approximately to the outer diameter of the central hinge tab 1. The height $h_2$ of the central hinge tab 1 is smaller by more than twice the height $h_2$ of the supporting ring 15 than the length $h_3$ of the sleeve which latter, in turn, includes the basic sleeve body 4 and two rings 14. The supporting ring 15 has the effect that the hinge remains stable with respect to inclinations.

Figure 4:
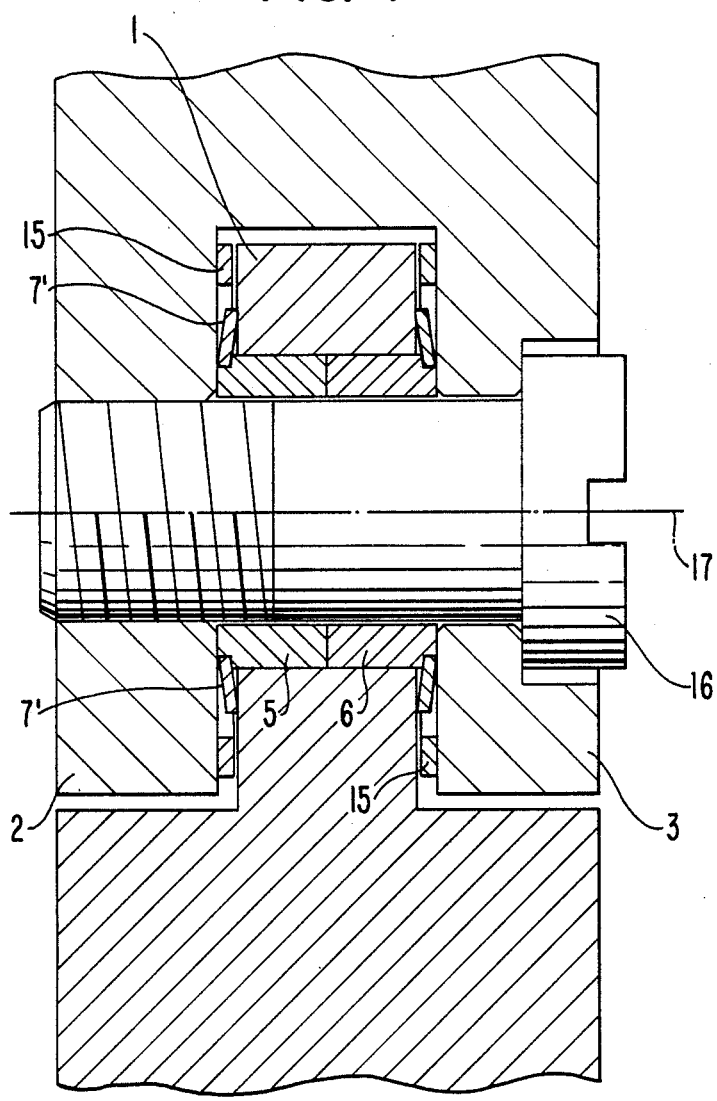
Figure 8:
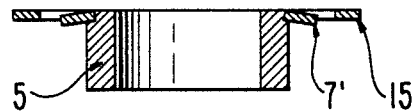
FIG. 8 is a section through a sleeve section produced by turning, with a welded-on plate spring, produced by punching, with supporting ring.

The construction of FIG. 4 is similar to FIG. 3 but, in order to facilitate assembly, the sleeve is fashioned to be of two parts, respectively, one spring plate 7' being welded to each sleeve part 5, 6 as shown most clearly in FIG. 8.

Figure 9:
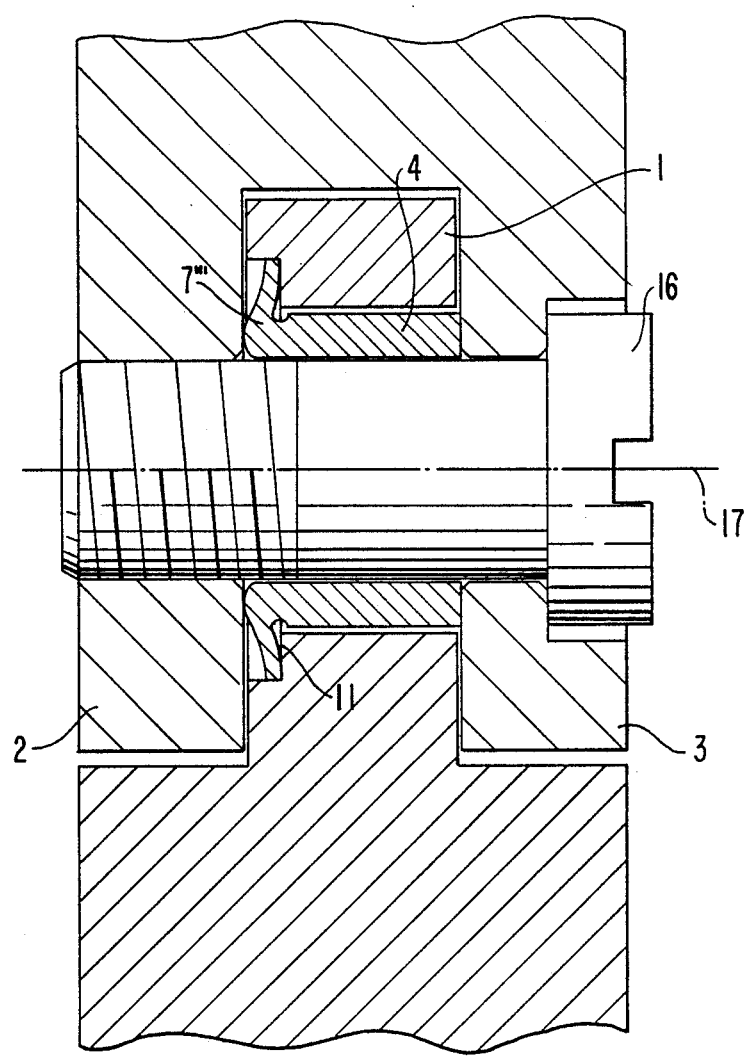
FIG. 9 is a cross-sectional view of an eyeglass hinge with motion regulation including onl one spring-elastic element.

FIG. 9 provides an example of an eyeglass hinge with motion regulation, wherein the sleeve includes only one spring-elastic element 7'''. The sleeve 4, acting as a spacer member, and the spring elastic element 7''' are made of one piece. Based on the unilateral construction and thus possible one-piece structure, this arrangement can be mounted in an especially simple fashion. Furthermore, the unilateral structure offers the possibility of incorporating with the same cross-sectional reduction, by producing the indentation by cutting, higher compressor forces, if necessary of double the magnitude, than in the case of bipartite sleeve construction described above. The unindented side of the central hinge eye, urged against the outer hinge eye by the spring, is in contact over the entire diameter and entire area. Therefore, this proposed construction is very rugged, wears well, and results in a minimum total tolerance.

Figure 10:
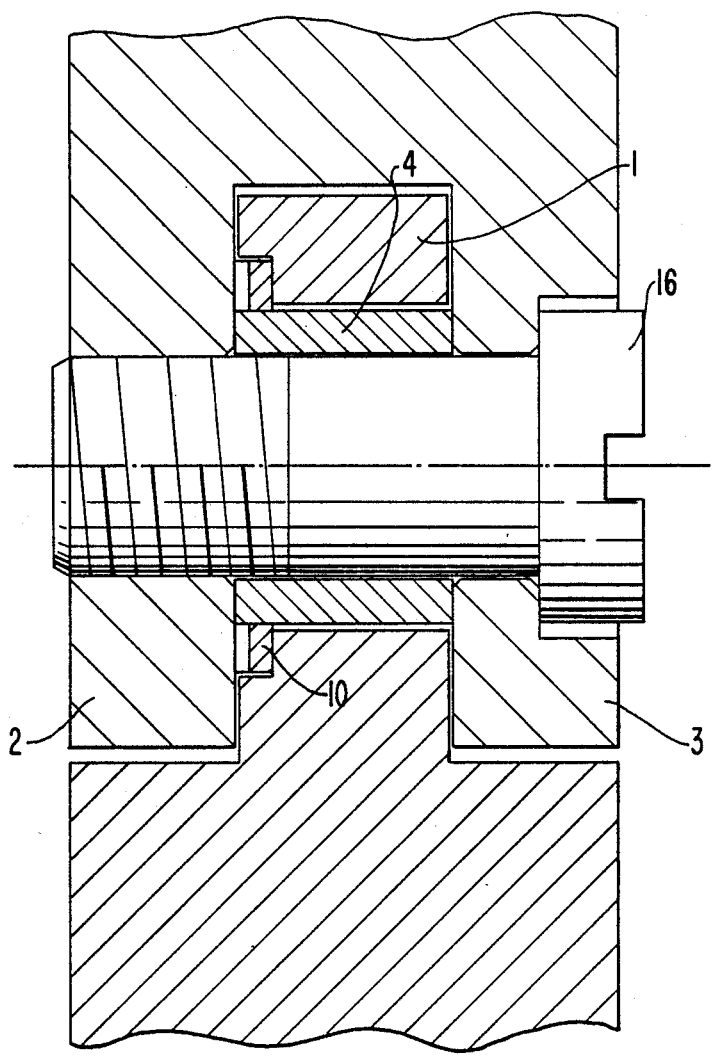
FIG. 10 is a cross-section of an eyeglass hinge with motion regulation including a corrugated spring as the spring-elastic element.
Figure 10A:
FIG. 10a is a perspective view of the corrugated spring of FIG. 10.

FIGS. 10 and 10a propose an eyeglass hinge with motion regulation incorporating a corrugated spring 10 which functions as the spring-elastic element in the above described embodiments.

Figure 11:
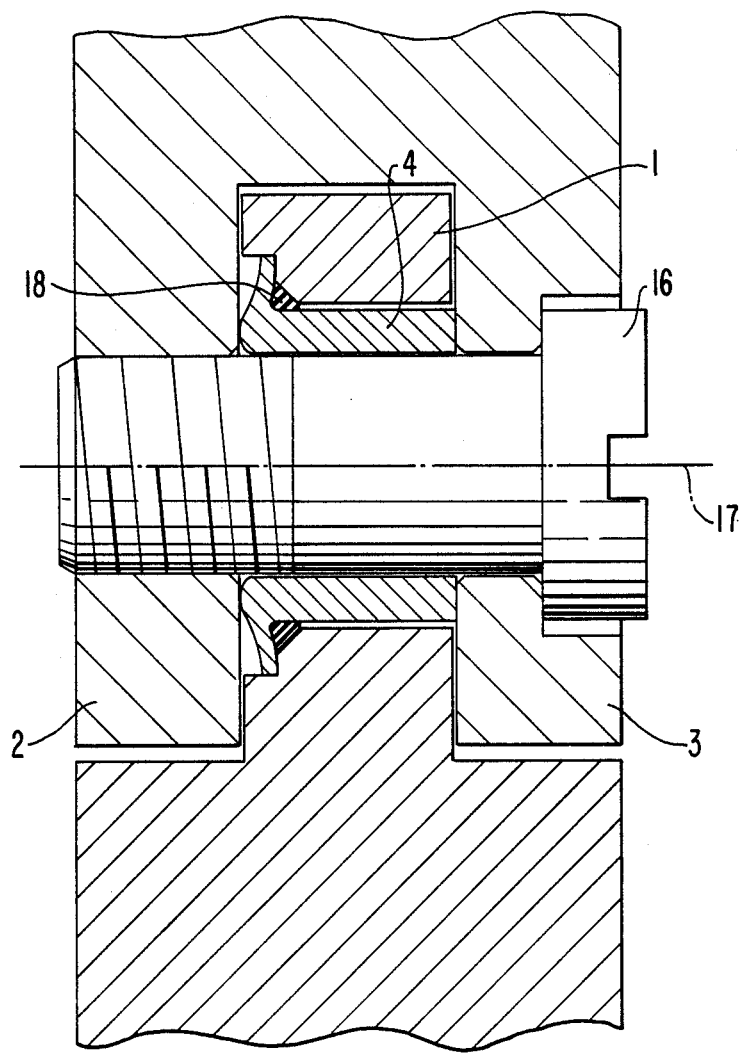
FIG. 11 is a cross-sectional view of an eyelass hinge of FIG. 9 provided with an additional 0-ring.
Figure 11A:
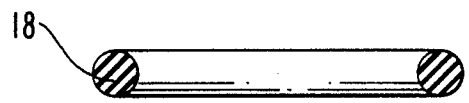
FIG. 11a is a cross-sectional view of the 0-ring of FIG. 11.

FIG. 11 and 11a propose yet a further modification of the eyeglass hinge regulator means of the present invention similar to FIG. 9, with an additional 0-ring 18. In FIGS. 11 and 11a, only a portion of the contact surface is oriented perpendicularly to the hinge screw axis 17, whereas, the part in contact with the 0-ring 18 extends obliquely to the hinge screw axis.

Figure 7:
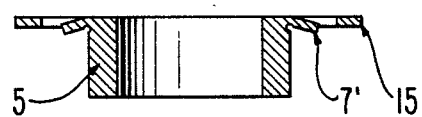
FIG. 7 is a section through a plate spring, produced by means of turning and punching, with supporting ring and sleeve.

FIG. 7 provides a cross-sectional view of a braking bushing as a turned part with punched-out spring segments.

In evident from the above description, the proposed motion regulation for hinges, particularly eyeglass hinges, provides a clearance-free hinge movement sustained over an entire lifetime of the eyeglasses wherein there results neither a seizing at the friction points and corresponding blockage of the articulation connection, nor an undesirable loose manipulation of the eyeglass temples. The friction sleeve regulation provides a resistance to movement that remains uniform.

While we have shown and described several embodiments in accordance with the present invention, it is understood that the same is not limited thereto, but is susceptible of numerous changes and modifications as known to one of ordinary skill in the art. Therefore, we do not wish to be limited to the details shown and described herein, but intend to cover all such changes and modifications as are encompassed by the scope of the appended claims.

We claim:

1. A motion regulator for a hinge including at least a first hinge tab and a second hinge tab, a hinge screw means for movably securing said first and second hinge tabs to each other, a rigid sleeve means for surrounding and accommodating the hinge screw means, said rigid sleeve means being disposed only in a hinge eye means of the second hinge tab for accommodating said rigid sleeve means, said rigid sleeve means having an axial length greater than an axial length of said hinge eye means so as to project beyond opposed edges defining respective ends of the hinge eye means of said second hinge tab tab in such a manner that the sleeve rotates with the second hinge tab, and at least one spring elastic means arranged between the first hinge tab and said second hinge tab under a pretensioning with said at least one spring elastic means being in contact with a contact surface of said first hinge tab means, said contact surface being radially symmetrically disposed with respect to a longitudinal center axis of the hinge screw means, and wherein said at least one spring means is, resilient in an axial direction with respect to the longitudinal center axis of said hinge screw means.

2. A motion regulator according to claim 1, wherein the at least one spring-elastic means is non-rotationally arranged with respect to the second hinge tab.

3. A motion regulator according to one or claims 1 or 2, wherein the at least one spring-elastic means includes a plate spring.

4. A motion regulator according to claim 3, wherein a further hinge tab is provided and arranged on a side of the second hinge tab opposite said first hinge tab, a spring elastic means is arranged between said second hinge tab and said first hinge tab and between said second hinge tab and said further hinge tab, and wherein the hinge is an eyeglass hinge.

5. A motion regulator according to one of claims 1 or 2, wherein the spring-elastic means includes a corrugated spring ring.

6. A motion regulator according to claim 3, wherein a further hinge tab is provided and arranged on a side of the second hinge tab opposite said first hinge tab, a spring elastic means in the form of a plate spring is arranged between said second hinge tab and said first hinge tab and between said second hinge tab and said further hinge tab, and wherein the hinge is an eyeglass hinge.

7. A motion regulator according to claim 1, wherein the contact surface is arranged approximately perpendicularly to the longitudinal center axis of the hinge screw means.

8. A motion regulator according to claim 1, wherein the at least one spring-elastic means is connected with the rigid sleeve means.

9. A motion regulator according to claim 8, wherein the at least one spring-elastic means is non-rotationally disposed with respect to the rigid sleeve means and at the rigid sleeve means, and wherein the at least one spring-elastic means rests against the contact surface of the first hinge tab in a zone of an end face of the second hinge tab.

10. A motion regulator according to claim 9, wherein the at least one spring-elastic means is rigidly joined to the rigid sleeve means.

11. A motion regulator according to one of claims 8 or 9, wherein the at least one spring-elastic means is formed integrally with the rigid sleeve means.

12. A motion regulator according to claim 11, wherein a further hinge tab is provided and arranged on a side of the second hinge tab opposite said first hinge tab, a spring elastic means is arranged between said second hinge tab and said first hinge tab and between said second hinge tab and said further hinge tab, and wherein the hinge is an eyeglass hinge.

13. A motion regulator according to claim 1, wherein a further hinge tab is provided and arranged on a side of the second hinge tab opposite said first hinge tab, a spring-elastic means is arranged between the second hinge tab and the first hinge tab and between said second hinge tab and said further hinge tab, said spring elastic means being respectively disposed in a zone of each end face of the second hinge tab, and wherein the respective spring elastic means contact a contact surface of said first hinge tab and said further hinge tab.

14. A motion regulator according to claim 13, wherein the rigid sleeve means includes a basic sleeve body, a supporting ring is disposed between an end face of the basic sleeve body and between an end face of said first and said further hinge tabs, and wherein the respective spring-elastic means are integrally formed with or separately joined to the respective supporting rings.

15. A motion regulator according to claim 14, wherein the basic sleeve body forms a cylindrical extension portion for the hinge screw means, said cylindrical extension portion contacting the first and further hinge tabs in an assembled condition of the hinge.

16. A motion regulator according to claim 15, wherein each spring-elastic means is respectively connected to opposite ends of the basic sleeve body.

17. A motion regulator according to one of claims 13, 14, 15, or 16, wherein a further hinge tab is provided and arranged on a side of the second hinge tab opposite said first hinge tab, a spring elastic means is arranged between said second hinge tab and said first hinge tab and between said second hinge tab and said further hinge tab, and wherein the hinge is an eyeglass hinge.

18. A motion regulator according to claim 8, wherein at least one of the first and second hinge tabs includes an indentation arranged concentrically with respect to a bore of the hinge eye means, said at least one spring-elastic means being adapted to engage said indentation in such a manner that one of an end face of the second hinge tab and a bottom surface of the indentation in the second hinge tab forms a contact surface for the at least one spring means.

19. A motion regulator according to claim 18, wherein the at least one spring-elastic means is surrounded by a supporting ring, said supporting ring has an outer diameter which is approximately equal to an outer diameter of the second hinge tab, and wherein an length of the rigid sleeve means is greater than an axial length of the second hinge tab by an amount greater than an axial length of the supporting ring.

20. A motion regulator according to claim 19 wherein the supporting ring is rigidly joined to the sleeve and, respectively, the ring.

21. A motion regulator according to one of claims 18, 19, or 20, wherein a further hinge tab is provided and arranged on a side of the second hinge tab opposite said first hinge tab, a spring elastic means is arranged between said second hinge tab and said first hinge tab and between said second hinge tab and said further hinge tab, and wherein the hinge is an eyeglass hinge.

22. A motion regulator according to claim 1, wherein the rigid sleeve means includes at least two sleeve sections which contact each other in an assembled condition.

23. A motion regulator according to claim 6, wherein an O-ring is arranged in a zone wherein the at least one spring-elastic means is disposed, said O-ring being in contact with the rigid sleeve means, with the at least one spring-elastic means, and with the first hinge tab.

24. A motion regulator according to one of claims 1, 8, 22 or 23, wherein a further hinge tab is provided and arranged on a side of the second hinge tab opposite said first hinge tab, a spring elastic means is arranged between said second hinge tab and said first hinge tab and between said second hinge tab and said further hinge tab, and wherein the hinge is an eyeglass hinge.

* * * * *